J. NAZARIAN.
LET-OFF MECHANISM FOR LOOMS.
APPLICATION FILED SEPT. 18, 1907.
899,183.
Patented Sept. 22, 1908.
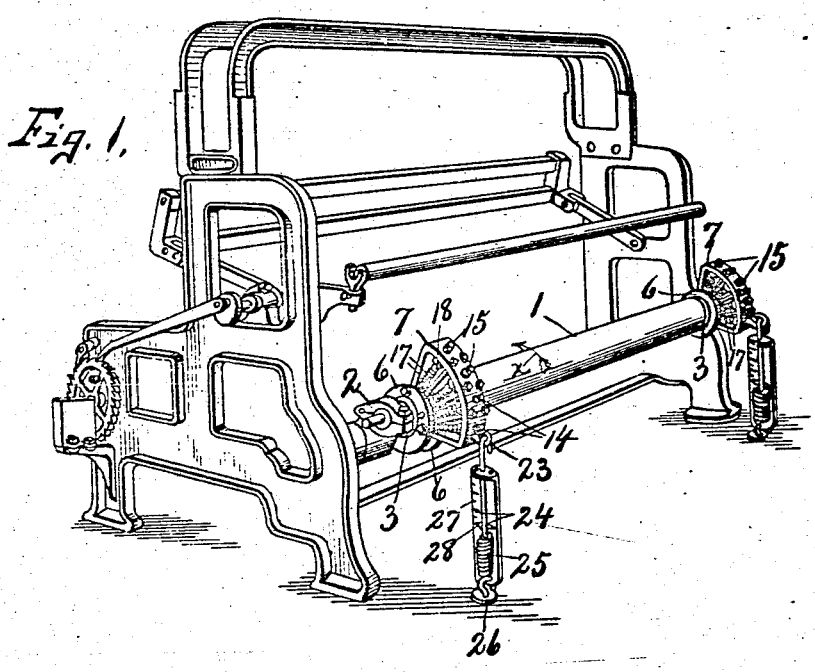
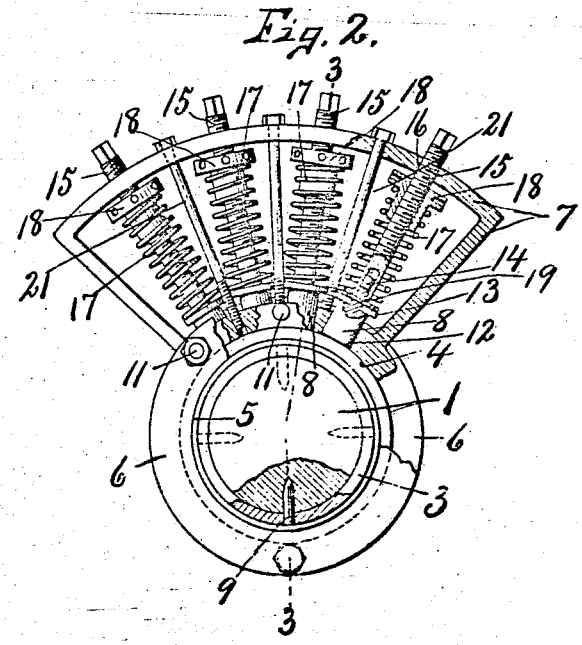
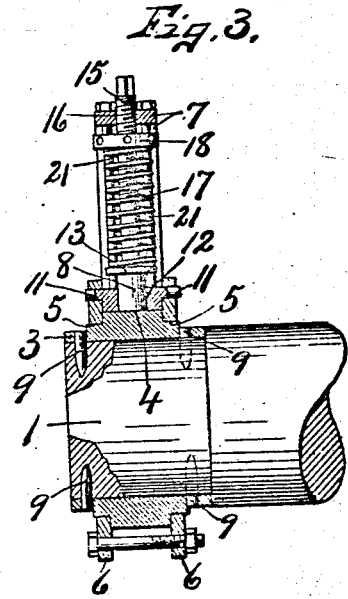

UNITED STATES PATENT OFFICE.

JOHN NAZARIAN, OF SYRACUSE, NEW YORK.

LET-OFF MECHANISM FOR LOOMS.

No. 899,183.        Specification of Letters Patent.        Patented Sept. 22, 1908.

Application filed September 18, 1907. Serial No. 393,548.

*To all whom it may concern:*

Be it known that I, JOHN NAZARIAN, of Syracuse, in the county of Onondaga, in the State of New York, have invented new and useful Improvements in Let-Off Mechanism for Looms, of which the following, taken in connection with the accompanying drawings, is a full, clear, and exact description.

This invention relates to certain improvements in let off mechanism for looms, and refers more particularly to means for frictionally retarding the rotary action of the beam of what is commonly known as the "let-off" motion.

My object, therefore, is to equip the "let-off" beam with one or more spring pressed friction devices whereby the tension of the warp may be varied.

Other objects and uses relating to the specific construction of the various parts of the retarding action will be brought out in the following description.

In the drawings—Figure 1 is a perspective view of a loom showing my improved friction retarding device for the let-off beam. Fig. 2 is an enlarged end view of one of the friction retarding devices and let-off beam or roller upon which it is mounted. Fig. 3 is a sectional view taken on line 3—3, Fig. 2 showing one end of the beam partly in elevation.

The friction retarding device and counter mechanism forming the subject-matter of my present invention may be applied to any modern loom using a rotary let-off, and in order to clearly demonstrate the practicability of my invention, I have shown a pair of friction retarding devices as applied to the opposite ends of a rotary let-off device or reel —1—, which is journaled at its ends in suitable bearings —2—, while its intermediate portion is circular and adapted to receive a quantity of warp which is unwound or let off from the reel in the usual manner during the operation of weaving.

As previously stated, these friction devices are mounted upon the opposite ends of the reel, preferably just inside of the bearings —2— and each preferably consists of a metallic friction band —3— having an enlarged central annular bearing —4— of less width than the band —3— forming opposite annular shoulders —5— of less diameter than the circular bearing —4— for receiving opposite retainer rings —6— which are located at opposite sides of and project some distance radially beyond the bearing face —4—. In other words, the rings —6— are rotatably mounted upon the annular shoulders —5— at opposite sides of the bearing face —4— and are detachably secured to a circumferentially movable frame —7— carrying a series of friction devices —8—, presently described. The circular bands —3— are secured to opposite ends of the let-off reel —1— by suitable fastening means, as pins —9—, which are passed through apertures in axially projecting flanges of the band —3—, said flanges extending in opposite directions some distance beyond the opposite faces of the enlarged central portion of the friction band to afford a reasonable broad bearing on the beam or reel. These bands, therefore, become a permanent part of and rotate with the reel while the frame —7— is separate and is movable circumferentially around and upon the circular bearing face —4— and is held in place by the circular retainer rings —6— which encircle and bear upon the annular bearings —5— and also against the sides of the enlarged central portion of the band —3—, upon which the circular bearing —4— is formed. These retainer rings —6— project some distance radially beyond the circular bearing face —4— and are provided with apertures for receiving the studs —11— which are secured to the inner side of the frame —7—, or rather to that portion of the frame which rides upon the circular bearing face —4—, thereby locking the frame and rings together to permit said frame and friction devices —8— carried thereby to be adjusted circumferentially around and upon the rings 3—.

The frame —7— is adapted to support a plurality of, in this instance, four radially projecting friction plungers —8— and preferably comprises inner and outer concentric segments spaced some distance apart and united at their ends by radial tie bars 21 forming an open segmental frame.

The plungers —8— are arranged side by side circumferentially of and against the circular bearing face —4— and are guided in radial apertures 12— in the inner segment of the frame —7—, each plunger having at its outer end a loose collar 13— and a reduced stem 14—which enters the socket in the inner end of a radial adjusting screw 15—, the latter extending outwardly through and beyond radial apertures 16— in the outer segment of the frame and terminates in an angular end adapted to receive a wrench or other device whereby the adjusting screw 15— may be rotated to force the inner end of its plunger into close proximity to the bearing face —4—.

Each friction plunger —8— is spring pressed against the bearing face —4— of the ring —3— by a separate coil spring 17— surrounding the adjusting screw 15— and having one end bearing against the collar 13— and its other end engaged by an adjusting nut 18— on the adjusting screw 15— just within the outer segment of the frame —7—, whereby the tension of the spring, and therefore, the pressure of the friction plunger may be readily varied at will to produce the desired frictional retarding action of the rotary beam or reel —1—.

Each collar 13— is loosely mounted upon the inner end of the plunger stem 14— and bears against the outer face of the plunger —8—, being held against undue outward radial movement by a pin 19— which passes through an aperture in the stem 14— and projects radially some distance therefrom to interlock with corresponding recesses in the inner end of the adjusting screw 15—; said pin 19— serving to lock the plunger —8— and its adjusting screw 15— to rotate together, although the plunger with its collar 13— thereon may be readily withdrawn from the socket in the inner end of the adjusting screw when the frame is removed from the ring —3— the recesses in the inner end of the screw —15— being open at the bottom to permit the springs —17— to force their plungers against the bearing —4—. This removal of the frame —3— may be readily accomplished by simply loosening the clamping bolts —11— and removing the rings —6— from connection with the frame —7— whereupon said frame may be lifted radially from between the rings and by removing the pins 19— the plungers 8— may be withdrawn inwardly from their apertures 12— in which they are guided, thus permitting the screws 15— to be screwed inwardly until disengaged from the outer segment of the frame —7—.

Each friction plunger and its adjusting means are identical, and therefore, the same description hereinbefore given applies to all of them, and in fact, in some instances, I may prefer to employ a single radially movable plunger spring pressed against the bearing face —4—, with means for varying the tension of the spring, and thereby varying the degree of pressure with which the plunger is pressed against the circular bearing face —4— of the reel —1—.

It is clear from the foregoing description that with the action of the spring pressure of the plungers —8— upon the circular bearing face —4— of the reel the frame —7— is free to move or to be adjusted circumferentially around said bearing face, and that while the plungers bear radially against one side of the band —3— the opposite sides of the ring —6— are thereby forced into frictional engagement with the annular shoulders —5— so that the friction pressure is really exerted at diametrically opposite sides of the band.

The frame —7— is made of comparatively light cast metal and in view of the fact that a large portion of the strain due to the tension of the springs 17— is borne by the outer segment of the frame, said outer segment is tied to the inner segment by tie bolts —21— which are located at regular intervals between the end tie pieces of the frame and alternate with the adjusting screws —15—, the latter being also arranged at regular intervals a uniform distance apart between the end pieces of the frame.

The reel or let-off beam —1— for the warp rotates in the direction indicated by arrow —X—, Fig. 1, and the frames —7— bearing the friction devices —8— normally project rearwardly from said beam and are provided with hooks or attaching elements —23— to which are connected suitable friction pressure indicating scales —24— having springs 25—, the lower end of the scales being attached to fixed anchorages —26— and are provided with suitable graduations —27— coacting with indicating fingers —28— to indicate the number of pounds of uplift on the frames, due to the friction of the plungers 8— with the bearing faces —4— on the reel. That is, the frictional connection between the bearing faces —4— of the reel and friction devices —8— and —6—, on the frame tend to rotate the frame in the same direction as the reel, thereby exerting an upward pull upon the indicating device —24 to indicate the amount of tension exerted upon the warp, which is wound upon the reel, and this tension may be varied at will by simply adjusting the nuts —18— or screws 15.

What I claim is:

1. In a loom, a let-off reel having an annular bearing face, a frame movable circumferentially around and upon said bearing face, a radially movable plunger spring-pressed against the bearing face of the reel, the spring and means for adjusting the tension of the spring.

2. In a loom, a let-off reel having a circular friction face in combination with a frame mounted on the reel and movable circumferentially, a friction plunger mounted in the frame, a spring for pressing said plunger against the friction face of the reel whereby the frame tends to rotate with the reel, and means attached to the frame for indicating the uplifting power tending to rotate the frame with the reel.

3. In a loom, a let-off reel having a circular friction face, a frame mounted on the reel, a radially movable plunger guided in the frame and bearing on said friction face, a spring for forcing said plunger into engagement with said friction face, means for tensioning said spring, and additional means for indicating the degree of pressure exerted by the plunger upon the friction face of the reel.

4. In a loom, a let-off reel having a circular friction face, a frame movable circumferentially relatively to said friction face, a series of plungers mounted in the frame and bearing upon said friction face, separate springs for forcing said plungers into engagement with the friction face, separate means for adjusting the tension of said springs, and means for limiting the movement of said frame.

5. In a loom, a let-off reel having an annular bearing, a plunger spring pressed against the bearing, a supporting frame for the plunger movable circumferentially of and upon the bearing and tending to rotate with the reel by reason of the friction of the plungers, and yielding means for resisting such rotation.

6. In a loom, a let-off reel having an annular bearing, a series of plungers spring pressed against said bearing, a supporting frame for said plungers movable circumferentially relatively to and upon the bearing and tending to rotate with said bearing by reason of the friction between the plungers and bearing, and a measuring device including yielding means for resisting the rotation of said frame with the bearing and indicating the degree of power tending to rotate the frame with said bearing.

7. In a loom, a let-off reel having a circular friction band, a ring encircling the band, a frame secured to the ring, a plunger on the frame, a spring for forcing said plunger into frictional engagement with the band, means for adjusting the tension of the spring, the frictional engagement of the ring and plunger with the band operating to move the frame circumferentially of the reel and yielding means to retard the action of the frame.

8. In a loom, a let-off reel having at each end a friction band, each friction band having a central annular bearing and reduced ends, a frame resting upon and adjustable circumferentially around said bearing, separate pairs of retaining rings, one pair for each frame, the rings of each pair encircling the reduced ends of the adjacent band to hold the frame in operative position, friction plungers guided in the frame and engaging the adjacent annular bearings, springs for forcing said plungers against their bearings, separate adjusting devices for varying the tension of said springs, and separate yielding means connected to the frames for holding the same against undue rotation with the reel.

9. In a loom, a let-off reel having a friction band provided with a central annular bearing and reduced ends, a plunger and supporting frame resting upon the annular bearing, rings encircling the reduced ends of the band and interlocked with the frame to hold the latter in operative position upon the reel, a radially movable plunger guided in the frame and having its inner end frictionally engaged with said bearing, a spring for forcing the plunger against said bearing, and means for adjusting the tension of the spring.

10. In a loom, a let-off reel having an annular bearing, a plunger supporting frame resting on said bearing, a plunger guided in said frame and frictionally engaged with said bearing, a spring for forcing the plunger against said bearing, means for varying the tension of said spring, a second spring having one end connected to a fixed anchorage and its other end connected to the frame to resist undue rotation of the frame with the reel, and means for indicating the frictional power tending to rotate the frame with the reel.

In witness whereof I have hereunto set my hand this 14th day of September 1907.

JOHN NAZARIAN.

Witnesses:
H. E. CHASE,
MILDRED M. NOTT.